United States Patent [19]

Dumolo

[11] 4,320,037
[45] Mar. 16, 1982

[54] FOUNDRY BINDERS BASED ON A PHENOLIC REACTION PRODUCT

[75] Inventor: David Dumolo, Dudley, England

[73] Assignee: Fordath Limited, West Bromwich, England

[21] Appl. No.: 154,393

[22] PCT Filed: Dec. 7, 1978

[86] PCT No.: PCT/GB78/00049

§ 371 Date: Aug. 7, 1979

§ 102(e) Date: Jun. 13, 1979

[87] PCT Pub. No.: WO79/00354

PCT Pub. Date: Jun. 28, 1979

[30] Foreign Application Priority Data

Dec. 7, 1977 [GB] United Kingdom ............... 50880/77

[51] Int. Cl.³ ..................... C08L 91/00; C08L 93/00; C08L 75/04; C08G 71/04
[52] U.S. Cl. .................................. 523/142; 525/453; 525/534; 528/75
[58] Field of Search ...................... 528/75; 260/24, 25, 260/18 TN; 525/453, 534

[56] References Cited

U.S. PATENT DOCUMENTS

| | | | |
|---|---|---|---|
| 3,420,915 | 1/1969 | Braithwaite | 260/837 |
| 3,429,848 | 2/1969 | Robins | 260/38 |
| 3,499,861 | 3/1970 | Kujawa et al. | 260/24 |
| 3,632,844 | 1/1972 | Robins | 260/18 TN |
| 3,725,333 | 4/1973 | Adkins et al. | 260/38 |
| 3,776,869 | 12/1973 | Sirota | 260/24 |
| 3,925,296 | 12/1975 | Stone et al. | 260/37 N |
| 4,094,834 | 6/1978 | Bowers et al. | 260/19 UA |
| 4,124,556 | 11/1978 | Schafer et al. | 260/DIG. 40 |
| 4,209,428 | 6/1980 | Dumolo | 260/18 TN |
| 4,224,201 | 9/1980 | Dumolo | 260/18 TN |

FOREIGN PATENT DOCUMENTS 1196807 7/1970 United Kingdom .
1348703 3/1974 United Kingdom .

*Primary Examiner*—H. S. Cockeram
*Attorney, Agent, or Firm*—Sughrue, Mion, Zinn, Macpeak and Seas

[57] ABSTRACT

A foundry mold or core is prepared by mixing with a foundry aggregate a polyisocyanate, a polymeric addition product of a phenol and a further material comprising aromatic hydroxyl groups, forming the mixture to the required shape and causing or permitting the polyisocyanate to react with both the addition product and the further material to bind the aggregate. The addition product may be prepared by reacting an unsaturated hydrocarbon with a phenol. The hydrocarbon may be comprised by a mixture of terpenes. The further hydroxy material may be a bisphenol or phenolic resin.

10 Claims, No Drawings

FOUNDRY BINDERS BASED ON A PHENOLIC REACTION PRODUCT

TECHNICAL FIELD

This invention relates to a method of preparing a foundry core or mould and to a binder for use in the method. In known methods of preparing foundry moulds and cores, a binder composition is mixed with an aggregate, usually sand, and the mixture is introduced into a mould to form the mixture into the required shape. The binder is then caused or allowed to cure and thereby produce a mould or core which is sufficiently robust to be used in a metal casting process.

BACKGROUND ART

There have been proposed a number of foundry binder compositions which are cured by reacting with a polyisocyanate. Some examples of these are disclosed in U.S. Pat. No. 3,925,296 which discloses binders comprising, in combination with an organic polyisocyanate, either a phenolic compound having at least two phenolic-OH groups, or a condensation product of a furan alcohol and an aldehyde, or a mixture of both of these. We have found that cores formed by use of binders disclosed in this U.S. Patent suffer from the disadvantage that the strength of the cores deteriorates unduly if the cured cores are stored.

Further examples of foundry binder compositions which are used in conjunction with polyisocyanates are disclosed in U.S. Pat. No. 3,429,848. This patent discloses the use, as a foundry binder, of condensation products obtained by reacting phenols with aldehydes. One disadvantage of the use of these condensation products as foundry binders is that water is produced in the condensation reaction. If water is present in the binder when this is mixed with the polyisocyanate, the water tends to react with the polyisocyanate so that the amount of polyisocyanate necessary to achieve a core having a required strength is greater than the amount which would be necessary if the foundry binder was anhydrous.

SUMMARY OF THE INVENTION

The qualities which are required in a foundry binder depend upon a variety of factors, including the use which is to be made of the mould or core, the equipment which is available for and the circumstances under which the core is to be produced and the nature of the aggregate.

There is no single binder which is ideally suited for all purposes. Furthermore, the binders which have been proposed heretofore exhibit various advantages and disadvantages to different degrees. Whilst it is desirable to produce a binder having qualities which are superior to those of binders presently available, it is also advantageous to provide a novel binder having a mix of qualities which is different from the mix of qualities provided by any known binder.

One object of the present invention is the provision of a foundry binder which has a different mix of qualities from that possessed by known binders. It is a further object of the invention to provide a foundry binder which can impart to cores a greater strength than that achieved by using the same quantity of a known foundry binder, or can achieve the same strength with the use of a smaller quantity than would be required to achieve that strength with a known binder.

According to a first aspect of the invention, there is provided a method of preparing a foundry core or mould wherein there is mixed with a foundry aggregate a polyisocyanate and a polymeric addition product of a phenol.

By a polymeric addition product of a phenol, we mean a product of an addition reaction between a phenol and a co-reactant to produce a product having, in each polymeric chain, at least two units derived from the phenol connected by a unit derived from the co-reactant.

The co-reactant preferably comprises, in each molecule, at least two carbon-carbon double bonds. Preferably, these bonds are not conjugated. Alternatively, the co-reactant may comprise a carbon-carbon triple bond.

The binder composition may incorporate a further aromatic hydroxy compound which reacts with the polyisocyanate more rapidly than does the aforesaid addition product. Bisphenols and other monomeric polyhydroxy phenols react relatively quickly with polyisocyanates in the presence of catalysts which are well known.

The polyisocyanate may be modified by reaction with a drying oil.

According to the invention, there is also provided a foundry core or mould produced by the method of the invention and, for use in admixture with a polyisocyanate as a foundry binder, a polymeric addition product of a phenol.

There is also provided in accordance with the invention a foundry mixture comprising an aggregate, a polyisocyanate and a polyhydroxy composition, the polyhydroxy composition including a product of an addition reaction between a phenol and an unsaturated hydrocarbon and, in admixture with said product, another reactant which is a polyfunctional aromatic hydroxy material.

DETAILED DESCRIPTION

In one example of a method in accordance with the invention, a polyisocyanate composition is prepared by modifying a mixture of polyisocyanates with a drying oil. The polyisocyanate mixture used is an aromatic polyisocyanate sold by ICI Chemicals Limited, England under the designation EDP 6503. This is of the diphenylmethanediisocyanate type. The drying oil is a raw linseed oil supplied by British Oil and Cake Mills Limited, England. The polyisocyanate composition also includes a solvent which is a petroleum fraction sold by Esso Chemicals Limited, England under the designation SOLVESSO 100.

To prepare the polyisocyanate composition, the polyisocyanate and linseed oil are heated together at a temperature of approximately 145° C. for approximately fifteen minutes. The mixture is then cooled and the solvent is added. The amounts used are such that the proportions by weight in the polyisocyanate composition are as follows:

| | |
|---|---|
| Polyisocyanate | 67.5% |
| Raw linseed oil | 22.5% |
| Solvent | 10% |

A polyhydroxy composition is prepared by carrying out an addition reaction between a phenol and an unsaturated hydrocarbon having two double bonds and mixing with the addition product a difunctional aromatic hydroxy compound.

The phenol may be $C_6H_5OH$ and this is reacted with the unsaturated hydrocarbon in the presence of a catalyst. Catalysts which are well known for use in Friedel-Crafts reaction may be used. In this particular example, the unsaturated hydrocarbon is comprised by a commercially available mixture of naturally occurring terpenes obtained from wood and known commercially by the designation "Dipentene". Dipentene is mainly a mixture of isomers having the formula $C_{10}H_{16}$.

A known quantity of the phenol is charged into a reaction vessel and there is added a weight of concentrated sulphuric acid equal to 1% of the weight of phenol, as catalyst. The mixture is heated to 50° C. and stirred continuously. There is then slowly added to the reaction vessel a weight of dipentene equal to the weight of phenol. An exothermic reaction occurs between the phenol and the dipentene and the temperature increases to 140° C. When addition of the dipentene has been completed, the reaction mixture is heated to a temperature of 160° C. and is maintained at that temperature for a period of four hours. The reaction mixture is then vacuum distilled to remove unreacted monomers. The presence of unreacted monomers can be detected by gas-chromatography and the amounts present can be determined by the same technique. The product of the reaction between the phenol and the dipentene is a brittle solid at room temperature and has a resinous or polymeric character.

The polyhydroxy composition is prepared by mixing the following constituents in the proportions indicated, by weight.

| Phenol-Dipentene reaction product | 15% |
|---|---|
| Bisphenol A | 42% |
| Solvent | 42.5% |
| Silane | 0.5% |

The solvent used is 2-ethoxyethyl acetate.

The silane is selected from silanes having the general formula $(RO)_3SiOR'$ where R is a hydrocarbon radical, preferably an alkyl radical of 1–6 carbon atoms and R' is a radical which is reactive with the isocyanate and/or the phenol/unsaturated hydrocarbon reaction product and/or polyhydroxy compound or the polyurethane which is produced by reaction between these. R' is preferably $-CH_2-CH_2-CH_2-NH-CH_2-CH_2-NH_2$ and may be alkyl, alkoxyalkyl, aminoalkyl, alkylaminoalkyl, epoxyalkoxyalkyl.

A foundry mixture comprising equal parts by weight of the polyisocyanate composition and the polyhydroxy composition is prepared by mixing these compositions with sand either in a batch mixer or in a continuous mixer. Typically, the weight of each composition used is 0.75% of the weight of sand. The foundry mixture is formed to the required shape by blowing or ramming into a core box and the mixture is then cured by passing a tertiary amine for example dimethylethylamine in gaseous form through the mixture. Curing may be carried out by a known gassing technique. The core can be removed from the box within a period ending about half a minute after passage of the catalyst through the mixture commences. The bench life of the mixture is 1 to 2 hours.

An alternative hydrocarbon which may be reacted with the phenol, in place of the dipentene, is 1,3-butadiene. A further alternative hydrocarbon which may be used is acetylene. The hydrocarbon undergoes an addition reaction with at least two molecules of the phenol. One or both of these may react with a further molecule of the hydrocarbon to form a polymeric chain comprising more than two aromatic OH groups. Preferably, there is provided for each mole of the phenol approximately one mole of the unsaturated hydrocarbon.

As an alternative to the reaction of the unsaturated hydrocarbon with a single phenol, the hydrocarbon may be reacted with a mixture of phenols. There may be used a blend of phenol itself with a material sold under the designation "VINSOL". Vinsol is a naturally occurring mixture of phenols derived from trees. Approximately equal weights of phenol and vinsol may be used.

In place of the bisphenol A, there may be used other monomeric polyfunctional phenols, for example resorcinol or catechol. As a further alternative there may be used in place of bisphenol A a polymeric material having aromatic OH groups. One suitable material is a phenol-formaldehyde resin. Suitable resins are mentioned in U.S. Pat. No. 3,429,848. Each molecule or polymeric chain should have at least two aromatic OH groups. These may be on the same aromatic nucleus or on different aromatic nuclei. The nucleus is preferably substituted at the para position.

In some cases, the required speed of reaction between the polyisocyanate and the polyhydroxy composition may be achieved without the presence of any phenolic material other than the addition product. Thus, the proportion of the phenol-unsaturated hydrocarbon addition product present in the polyhydroxy composition may vary within the range 5% to 100%. The proportion of bisphenol A or other polyfunctional aromatic hydroxy material may vary from 0% to 60% of the polyhydroxy composition. In a case where the amount of bisphenol A is in the upper part of this range, the solvent is preferably a polar solvent, for example an ether, an ester or a ketone. The proportion of solvent in the polyhydroxy composition may vary within the range 0% to 50%.

The amount of drying oil used may be within the range 5% to 50% of the weight of the polyisocyanate. As an alternative to modification of the polyisocyanate with a drying oil, there may be reacted with the polyisocyanate one or more modifiers selected from glycerides, alkyds, long chain aliphatic acids, polyhydroxy compounds with widely spread hydroxyl groups, amides and ureas. One or more of these modifiers may be used together with a drying oil.

The reaction between the polyisocyanate and the polyhydroxy composition may be catalysed by any of the many well known catalysts listed in the book "Polyurethanes: Chemistry and Technology" by Saunders and Frisch, published by Wiley in 1962.

In a further example of a method in accordance with the invention, a polyisocyanate composition is prepared in the manner hereinbefore described. A polyhydroxy composition is prepared by carrying out an addition reaction between a phenol and an unsaturated hydrocarbon having a triple bond and mixing with the addition product a difunctional aromatic hydroxy compound.

Into a reaction vessel there is charged one mole of phenol and 0.1 mole % of a boron-trifluoride-acetic acid complex as catalyst. This complex is a well known catalyst for Friedel-Crafts reactions. The mixture is heated to a temperature of 50° C. and there is passed into the mixture gaseous acetylene. An exothermic reaction occurs and the temperature is maintained at 50° C. When the weight of the mixture has increased by the weight of one mole of acetylene, the flow of acetylene is terminated, the temperature is raised to 80° C. and is maintained at this value for three hours. Unreacted monomers are then removed by vacuum distillation. The reaction product thus prepared is mixed with bisphenol A, solvent and a silane in the same proportions as those indicated hereinbefore. This mixture is used in the manner hereinbefore described to prepare a foundry core.

I claim:

1. In a method of preparing a foundry core or mould wherein there is mixed with a foundry aggregate a polyisocyanate and a polyhydroxy composition, the mixture is formed to the required shape and the polyisocyanate and polyhydroxy composition react together to bind the aggregate, the improvement comprising employing as the polyhydroxy composition a polymeric addition product prepared by reacting a phenol with a substance comprising a carbon-carbon triple bond or at least two carbon-carbon double bonds.

2. A method according to claim 1, wherein the substance comprising a carbon-carbon triple bond or at least two carbon-carbon double bonds reacted with the phenol is a hydrocarbon.

3. A method according to claim 1, wherein the substance comprising at least two carbon-carbon double bonds is a terpene.

4. A method according to claims 1, 2 or 3, wherein the polyhydroxy composition further comprises a material having aromatic hydroxyl groups and a functionality of at least two.

5. A method according to claim 4, wherein said material is a phenol having a functionality of at least two.

6. A method according to claim 4, wherein said material is a phenolic resin.

7. A method according to claims 1, 2 or 3, wherein, prior to mixing with the polyhydroxy composition and the aggregate, the polyisocyanate is modified by reaction with at least one modified selected from drying oils, glycerides, alkyds, long chain aliphatic acids, polyhydroxy compounds with widely spaced hydroxyl groups amides and ureas.

8. A method according to claim 7, wherein the polyhydroxy composition further comprises a material selected from the group comprising phenols having a functionality of at least two and phenolic resins.

9. The method of claim 1, wherein the polyhydroxy composition additionally comprises a material having aromatic hydroxyl groups and a functionality of at least two.

10. A foundry composition comprising an aggregate, a polyisocyanate and a polyhydroxy composition comprising a polymeric addition product prepared by reacting a phenol with a substance comprising a carbon-carbon triple bond or at least two carbon-carbon double bonds, and a material having aromatic hydroxyl groups and a functionality of at least two.

* * * * *